United States Patent
Bender et al.

(10) Patent No.: US 6,287,617 B1
(45) Date of Patent: Sep. 11, 2001

(54) GRAM NEGATIVE ANTIBACTERIAL COMPOSITION

(75) Inventors: Fredric G. Bender, McMurray, PA (US); William King, Walnut Creek, CA (US); Xintian Ming, Cottage Grove, WI (US)

(73) Assignee: Rhodia Inc., Cranbury, NJ (US)

( * ) Notice: Subject to any disclaimer, the term of this patent is extended or adjusted under 35 U.S.C. 154(b) by 0 days.

(21) Appl. No.: 09/496,818

(22) Filed: Feb. 2, 2000

(51) Int. Cl.⁷ .............................. A23B 4/027; A23B 4/22
(52) U.S. Cl. .................. 426/335; 426/615; 426/641; 426/643; 426/646; 426/652
(58) Field of Search .................................. 426/335, 615, 426/652, 641, 643, 646

(56) References Cited

U.S. PATENT DOCUMENTS

| | | | |
|---|---|---|---|
| 4,001,443 | * 1/1977 | Dave | 426/335 |
| 5,043,176 | * 8/1991 | Bycroft et al. | 426/335 |
| 5,354,568 | * 10/1994 | Bender et al. | 426/335 |
| 5,458,876 | * 10/1995 | Monitcello | 426/335 |

* cited by examiner

*Primary Examiner*—Helen Pratt

(57) ABSTRACT

A method for eliminating, reducing or retarding the amount of gram negative bacteria in cut fruits, cut vegetables, seafood, meat strips or meat chunks comprising the steps of:
(a) treating the surface of said fruits, vegetables, seafood or meat with a chemical having a pH of greater than 8.5 in an amount of effective to destroy or disrupt the outer membrane of said gram negative bacteria; and then
(b) treating said surface with an effective amount of one or more agents having bactericidal activity against gram positive bacteria is provided.

6 Claims, No Drawings

GRAM NEGATIVE ANTIBACTERIAL COMPOSITION

BACKGROUND OF THE INVENTION

1. Field of the Invention

The present invention relates to a process for reducing or retarding the amount of gram negative bacteria for specific classes of food products by treatment with gram positive bactericidal compounds. More specifically, the process comprises first applying one or more highly alkaline substances to the food surface to be treated to disrupt the structure of the outer membrane of the gram negative bacteria followed by treatment with a gram positive bactericide.

2. Technology Description

There has been extensive research conducted in the field of food safety to develop compositions which function as food grade anti-bacterials. In particular, gram negative bacteria such as *E. Coli,* salmonella, campylobacter and the like pose significant risk to consumers of food. Also, gram negative spoilage bacteria such as pseudomonas, alcaligenes, and erwinia species can cause spoilage, though not illness, and are often the principal factors in reducing the shelf life and freshness of selected processed foods. Both pathogenic and spoilage bacteria occur primarily at the surfaces of food which come into contact with the bacteria by contamination environmental sources. The bacteria can then spread to other parts of the food through mixing, comminuting, or other direct contact. These bacteria then grow during handling and storage of the food, resulting in either spoilage or a pathogenic risk in the food.

Largely because of the strong consumer desire for convenience foods, there has been a wide increase in certain products such as cut vegetables, cut fruits, and the like. The so-called "salad in a bag" products have gained great consumer acceptance as a result of their convenience of use. However, such products are much more susceptible to bacterial degradation as a result of cross contamination with gram negative bacteria occurring at the surface of one or more cut pieces of vegetables contacting other cut pieces present in the package.

In addition there continues to be great concern over the possible contamination of ground meat and seafood as a result of gram negative bacteria. Such contamination has caused deaths and product recalls, closing of plants due to sanitary concerns, and the like. Much of the pathogenic concern associated with these foods is caused by gram negative bacteria such as *E. coli* H7:0157 and *Campylobacter jejuni.*

U.S. Pat. Nos. 5,096,718 and 5,260,061 disclose the use of metabolites of propionic acid bacteria in certain foods to increase the shelf life of the resulting products. These metabolites demonstrate enhanced efficacy against gram negative bacteria but are not as effective against gram positive bacteria.

JP 07-115950 suggests the combination of bacteriocins produced by lactic acid bacteria of the propionibacterial genus in combination with either organic acids and their salts, fatty acid esters of polyhydric alcohols, amino acids, antibacterial peptides and proteins, polysaccharides comprising sugars, saccharic acids and amino sugars and their partial decomposition products, spices and their essential oils and plant components; and alcohols.

U.S. Pat. No. 5,217,250 suggests the use of nisin compositions as bactericides. Nisin is a lantibiotic, more specifically, a polypeptide with antimicrobial properties which is produced in nature by various strains of the bacterium *Streptococcus lactis.* Nisin is primarily effective against gram positive bacteria. This patent suggests that the combination of a chelating agent, such as EDTA or other acetate salts or citrate salts with nisin can result in a broad range bactericide.

U.S. Pat. Nos. 5,573,797; 5,593,800 and 5,573,801 disclose antibacterial compositions which include a combination of a Streptococcus or Pediococcus derived bacteriocin or synthetic equivalent antibacterial agent in combination with a chelating agent. The composition is applied to the surface of the food to be treated either by direct application or by incorporating the composition onto a flexible film casing which is placed into intimate contact with the food surface. The chelating agent binds free divalent cations in the outer membrane of gram negative cells, improving permeability to the antibacterial agents.

U.S. Pat. No. 5,458,876 suggests the combination of a antibiotic with lysozyme as an antibacterial. In this case, lysozyme breaks down the cell wall and weakens the structural integrity of the target cell so that the antibacterial agent becomes more effective in damaging or killing the bacterial cell.

EP 0 466 244 discloses a composition having improved antibacterial properties comprises a mixture of at least one of each of the following groups of compounds: (I) a cell wall lysing substance or a salt thereof, (II) an antibacterial compound and (III) an adjuvant selected from organic acids acceptable for use in food products or preparations for cosmetic use or personal hygiene or salts of these acids, phosphates and condensed phosphates or the corresponding acids, and other sequestering agents. Preferably (I) is lysozyme, (II) may be a bacteriocin (e.g. nisin or pediocin), and (III) may be acetic acid, lactic acid, citric acid, propionic acid, tartaric acid, orthophosphates, hexametaphosphates, tripolyphosphates, other polyphosphates or sequestering agents containing substituted or non-substituted amino groups, for example EDTA.

EP 0 453 860 suggests the combination of nisin with a phosphate buffer effective at a pH of between 5.5 and 6.5 to eradicate gram negative bacteria from surfaces.

WO 97/23136 suggests a bacterial decontamination method which involves treatment with a solution of low concentration alkali metal orthophosphate combined with either osmotic shock and/or lysozyme in solution and/or nisin in solution. This reference tested the combination of low concentrations of trisodium orthophosphate with lysozyme against certain bacteria on lettuce leaves or chicken skin, and the combination of low concentrations of trisodium orthophosphate with nisin against certain bacteria on chicken skin.

Published Australian patent application AU-A-18604/88 discloses the use of bacterialyzing enzyme products with N-acetylmuramidase, e.g. lysozyme, together with non-enzymatic preservatives for preserving foodstuffs. Non-enzymatic preservatives mentioned in this publication are complexing agents such as citric acid and EDTA, amino acids, particularly proteinogenic acids, such as cysteine, alanine, tyrosine and glycine and nucleosides and nucleotides such as inosine 5'-inosine monophosphate or phosphates such as tetrasodiumpyrophosphate (diphosphate), sodium tripolyphosphate (triphosphate) and polyphosphate or reddening agents such as alkali metal nitrates.

Despite the above teachings, there still exists a need in the art for a method for treating food surfaces, and specifically cut vegetables, cut fruits, ground meat or seafood, which is effective against gram negative bacteria. More specifically, there exists a need for more effective treatments that can be readily integrated into existing processing protocols for these products.

BRIEF SUMMARY OF THE INVENTION

It is now discovered, quite surprisingly, that a method for treating cut vegetables, cut fruits, ground meat or seafood against gram negative bacteria by utilizing a gram positive bactericidal compound can be practically provided to the processor of such foods.

In a first embodiment, the present invention provides a method for eliminating, reducing or retarding the amount of gram negative bacteria in cut fruits, cut vegetables, seafood or meat chunks comprising the steps of:
(a) treating the surface of said fruits, vegetables, seafood or meat with a chemical having a pH of greater than 8.5 in an amount effective to destroy or disrupt the outer membrane of said gram negative bacteria; and then
(b) treating said surface with an effective amount of one or more agents having bactericidal activity against gram positive bacteria.

In particularly preferred embodiments, the chemical used in step (a) of the inventive process comprises trisodium orthophosphate and the agent in step (b) comprises nisin or lysozyme or a combination thereof. In still other preferred embodiments, the surface of the food product to be treated is first treated with a minor amount of chlorine to further aid in the process.

An additional embodiment of the present invention comprises cut vegetables, cut fruit, ground meat or seafood having reduced gram negative bacteria as a result of having been treated with the above process.

It is an object of the present invention to provide a process for treating certain classes of food products against gram negative bacteria.

An additional object of the present invention is to provide a specific class of food product having reduced levels of gram negative bacteria.

These, and other objects, will readily be apparent to those skilled in the art as reference is made to the detailed description of the preferred embodiment.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

The present invention provides a process for reducing, retarding or totally eliminating gram negative bacteria from either cut vegetables, cut fruit, ground meat or seafood through the use of a process which enables gram positive bactericidal compounds to treat gram negative bacteria.

The term "cut vegetables" refers to vegetables which have been processed (i.e., cut) prior to packaging. These include, but are not limited to all types of lettuce, celery, carrots, radishes, sprouts, peppers, mushrooms, onions, olives, beans, cauliflower, broccoli, cucumbers, and the like. Similarly the term "cut fruits" refers to any type of fruit which has been processed prior to packaging, such as fresh or canned pineapple, melons, oranges, peaches, apples, pears, grapes, cherries, and the like. The term "ground meat" refers to meat which is ground prior to cooking and use. This includes ground beef, veal, poultry or pork; sausage products, and the like. In the case of ground meats, the inventive process is advantageously performed while the meat is still in chunk or strip form and prior to grinding. The term "seafood" refers to processed seafood such as fish fillets, as well as shrimp, surimi, crab, sushi and the like.

The first step of the inventive process comprises treating the surface of the cut vegetables, cut fruit, meat (strips or chunks) or seafood with a chemical having a pH of at least 8.5 in an amount effective to lyse, destroy or otherwise disrupt the structure of the outer membrane of gram negative bacteria occurring on the food surface.

In particularly preferred embodiments, the chemical has a pH of greater than 11 and is selected from trisodium orthophosphate (either anhydrous or dodecahydrate), sodium hydroxide, sodium carbonate, potassium hydroxide, potassium carbonate, and the like. The use of trisodium orthophosphate is particularly preferred.

Also considered as being within the scope of the present invention is the use of ammonia as the chemical having a pH of at least 8.5.

The amount of the treatment chemical used in this first step of the process is the amount necessary to disrupt, lyse or destroy the bacterial outer membrane. Routine experimentation can be conducted by one skilled in the art to determine the optimal level of each selected chemical. Complete destruction of the outer membrane is not specifically required as the goal is to merely disturb or disrupt it so that its interior contents are exposed and can thereafter be treated in the second step of the inventive process.

In the embodiment where trisodium orthophosphate is selected as the treatment chemical, it is preferably used at a concentration (based on the anhydrous amount) of between about between 0.01 to 10%, more preferably between 0.1 and 1.0%, a level that is not routinely lethal to surface bacteria in foods. In addition, where trisodium orthophosphate is selected for use, the surface of the food to be treated may first be pretreated with an amount of chlorine to aid in the treatment process. In this embodiment, the amount of chlorine is to be added should be between about 5 and about 100 ppm (by weight of the rinse water used for treatment) and more preferably about 20 ppm, which is also not a routinely lethal level for such foods.

The second step of the inventive process comprises treating the food surface with one or more compounds having bactericidal activity against gram positive bacteria. Such compounds include, but are not limited to lantibiotics, lysozyme and pediocin and lacticin class bacteriocins. Combinations of more than one compound having bactericidal activity against gram positive bacteria (e.g., nisin and lysozyme) are specifically contemplated as falling within the scope of the present invention. The gram positive bactericide should be added in an amount effective to destroy or retard the growth of the gram negative bacteria by action on the outer membrane, cell wall and cell membrane of said bacteria.

A first class of gram positive bactericides comprises a lantibiotic. The term "lantibiotics" was coined by Schnell et al. (1988. Nature 333:276–278) to describe a group of bacteriocins including nisin which contain the amino acid lanthionine and other "nonprotein" amino acids. The common properties of these bacteriocins are reviewed by Kellner et al. (1988. Eur. J. Biochem 177:53–59) wherein they note that" . . . polycyclic polypeptide antibiotics possess a high content of unsaturated amino acids (dehydroalanine, dehydrobutrine) and thioether amino acids (meso-lanthionine, (2S,3S,6R)-3-methyllanthionine). Furthermore, lysinoalanine, 3-hydroxyaspartic acid and S-(2-aminovinyl)-D-cystine are found in some members." Members of this group include nisin, subtilin, pep 5, epidermin, gallidermin, cinnamycin, Ro09-0198, duramycin and ancovenin. These ribosomally synthesized peptide antibiotics contain from 19 to 34 amino acids and are produced by various microbes including Staphlococcus species, Bacillus species and Streptomyces species. in addition to their unique composition of non-protein amino acids, they can be distinguished from other polypeptide antibiotics on the basis of their specificity. Bacteriocins in general, and the lantibiotics in particular, are characterized by a very narrow spectrum of action. Thus, only a few species of bacteria are sensitive to a particular bacteriocin at practical concentrations. This is in contrast with other broad spectrum polypeptide antibiotics, such as polymixin B1 which are active against most bacteria and the "lytic peptides" discussed by Jaynes et al., in published international application WO 89/00194, which are active against most bacteria, yeasts and even mammalian cells.

Nisin occasionally occurs as a dimer with a molecular weight of about 7000. It contains several unusual amino acids including b-methyllanthionine, dehydroalanine, and lanthionine among its total of 34 amino acids. There are five unusual thio-ether linkages in the peptide which contribute to its stability in acid solutions. Nisin is one of the most thoroughly characterized bacteriocins, and shares remarkable homology of structure and action with other lantibiotics, for example Subtilin and epidermin [Buchman et al 1988. J. Bio. Chem. 263 (31):16260–16266]. Recent reviews of nisin, its physical properties and uses include "Bacteriocins of Lactic Acid Bacteria", T. R. Klaenhammer, 1988. Biochimie 70:337–349, "Nisin", A. Hurst, 1981. Avd. Appl. Microbiol. 27:85–121, and U.S. Pat. No. 4,740,593. Nisin is the collective name describing several closely related substances which exhibit similar amino acid compositions, and some limited range of antibiotic activity. This phenomenon is discussed by E. Lipinska in "Antibiotics and Antibiosis in Agriculture" (M. Woodbine, Ed.) pp. 103–130.

The use of nisin to combat *L. monocytogenes* has been reported by M. Doyle; "Effect of Environmental and Processing Conditions on *Listeria Monocytogenes*", Food Technology, 1988.42(4):169–171. This reference describes the initial inhibition of the organism's growth (for about 12 hours) and reports that *L. monocytogenes* may grow at a pH level as low as 5.0 and is resistant to alkaline pH with the ability to grow at pH 9.6.

Nisin is commercially available from Rhodia Inc. under the trademark MICROGARD® MG300, and in purified form under the trademark Novasin™. In practice the lantibioitic is added to the food product in amounts between about 1 to about 25 ppm (by weight of solution used for treatment) of active ingredient (nisin).

A second class of gram positive bactericide comprises the enzyme known as lysozyme. When lysozyme is used, it is added to the food product in amounts between about 20 to about 500 ppm (by weight of solution used for treatment), more preferably between about 50 to about 100 ppm. Lysozyme is also commercially available from Rhodia under the trademark NovaGARD™. Lysozymes (Muramidase; mucopeptide N-acetylmucamoylhydrolase; 1,4-.beta.-N acetylhexosaminodase, E.C. 3.2.1.17) are mucolytic enzymes which have been isolated from various sources and are well characterized enzymes. First discovered in 1922 by W. Fleming, egg white lysozyme was among the first proteins sequenced, the first for which a three dimensional structure was suggested using x-ray crystallography and the first for which a detailed mechanism of action was proposed. Its antimicrobial activity against gram positive bacteria is well documented, for example by V. N. Procter et al in CRC Crit. Reviews in Food Science and Nutrition, 1988, 26(4):359–395. The molecular weight of egg white lysozyme is approximately 14,300 to 14,600, the isoelectric point is pH 10.5–10.7. It is composed of 129 amino acids which are interconnected by four disulfide bridges. Similar enzymes have been isolated and characterized from other sources including such diverse producers as *Escherichia coli* bacteriophage T4 and human tears. Despite slight differences (for example, the human lysozyme has 130 amino acids) the capacity for hydrolysis of acetylhexosamine polymers remains essentially the same. Accordingly, for purposes of this invention, the term lysozyme is intended to include those outer membrane degrading enzymes which have the ability to hydrolyze acetylhexosamine and related polymers.

Lysozyme is known to kill or inhibit the growth of bacteria and fungi, and is used in Europe to control the growth of the spoilage organism *Clostridium tyrobutyrucum* in cheese. It has also been proposed for use in a variety of other food preservation applications and has been reported to inhibit the growth of (and in some cases kill) *Listeria monocytogenes* (Hughey et al, 1987, AppI. Environ. Microbiol 53:2165–2170).

As alternatives to lantibioitics and lysozyme, it is also believed that use of a Pediococcus bacterial metabolite, specifically pediocin, as a substitute could yield efficacious results. Also, the new class of bacteriocins called lacticins should produce similar synergism with the initial alkaline treatment step for activity against gram negative bacteria. Both pediocins and lacticins are compounds known to have selected activity against gram positive, but not gram negative bacteria.

The specific mechanism for why the inventive combination of steps yields outstanding results is not completely understood. One theory is that the alkaline pH chemical used in the first step of the process degrades or destroys the outer membrane of the wall of the gram negative bacteria. Scanning electron micrographs demonstrate that 100% of either Pseudomonas or *E. coli* cells treated with sublethal levels of trisodium orthophosphate at pH=11 show extensive cell outer membrane damage. It is the gram negative cell's outer membrane which renders gram positive bactericides ineffective against gram negative bacteria as the tight lipopolysaccharide outer membrane prevents the cell wall and cell membrane from coming into contact with gram positive bactericides. Gram positive cells have a much thinner outer membrane which does not provide the same barrier effect. It is believed that the interior cell wall and cell membrane of the gram negative bacteria cell would be sensitive to gram positive bactericides if the gram positive bactericide could gain access to those target areas in the wall and inner membrane. Accordingly, since the interior wall and membrane of the gram negative bacteria are made available as a result of the degradation or destruction of the outer membrane by treatment with the alkaline pH chemical, the gram positive bactericide can thereafter access the interior sensitive areas of the cell and therefore effectively function against gram negative bacteria.

The following non-limiting examples illustrate the broad range antimicrobial compositions which constitute the present invention.

EXAMPLE 1

Cut Vegetables

Cut vegetables (lettuce, carrots, and radishes) which are to be packaged and sold as "salad in a bag" are first treated with a 20 ppm chlorine solution (by weight of treatment solution containing chlorine). A solution of trisodium orthophosphate having a concentration of between 0.1 to 1.0% based on the anhydrous amount is applied to the surface of the vegetables, followed by the addition of a nisin solution in an amount of 1 to 25 ppm (active nisin) by weight of the nisin solution used for surface treatment or a lysozyme solution in an amount of 50 to 100 ppm (active lysozyme) by weight of the lysozyme solution or a combination of nisin solution and lysozyme solution in the above amounts. As a result of this treatment method the vegetables have a reduced amount of gram negative bacteria and are suitable for packaging. The shelf life of the cut vegetables is extended due to the reduced load of gram negative spoilage bacteria.

EXAMPLE 2

Cut Fruits

The experiment of Example 1 is repeated except the food to be treated is cut fruit. The resulting fruit has a reduced amount of gram negative bacteria, an extended shelf life, and is suitable for packaging.

EXAMPLE 3

Meat Chunks

The experiment of Example 1 is repeated except the food to be treated is meat chunks or strips, and particularly beef chunks. The resulting chunks or strips have a reduced amount of gram negative bacteria and an extended shelf life. The chunks or strips can then be ground and packaged.

EXAMPLE 4

Seafood

The experiment of Example 1 is repeated except the food to be treated is fish fillets, surimi, sushi, shrimp or crab. The resulting seafood has a reduced amount of gram negative bacteria, an extended shelf life, and can then be packaged.

Having described the invention in detail and by reference to the preferred embodiments thereof, it will be apparent that modifications and variations are possible without departing from the scope of the appended claims.

What is claimed is:

1. A method for eliminating, reducing or retarding the amount of gram negative bacteria in a food selected from the group consisting of cut fruits, cut vegetables, seafood, meat strips or meat chunks comprising the steps of:

(a) treating the surface of said food with a chemical having a pH of greater than 8.5 in an amount effective to destroy or disrupt the outer membrane of said gram negative bacteria; and then (b) treating said surface with an effective amount of one or more agents having bactericidal activity against gram positive bacteria.

2. The process of claim 1 wherein said chemical in step (a) is selected from the group consisting of trisodium orthophosphate (anhydrous or dodecahydrate), sodium hydroxide, sodium carbonate, potassium hydroxide, potassium carbonate, ammonia, and mixtures thereof.

3. The process of claim 1 wherein said agent in step (b) is selected from the group consisting of lantibiotics, lysozyme, pediocin, lacticin, and mixtures thereof.

4. The process of claim 1 wherein, prior to step (a), said fruits, vegetables, seafood or meat are pretreated with chlorine.

5. The process of claim 1 wherein the pH of the chemical in step (a) is greater than 11.

6. The process of claim 1 wherein said food comprises meat chunks or meat strips and wherein said meat chunks or meat strips are ground after step (b).

* * * * *